United States Patent

[11] 3,623,014

[72] Inventors Melvin L. Doelz
Corona Del Mar;
Robert F. Martin, Orange; Fred K.
Morioka, Tustin, all of Calif.
[21] Appl. No. 852,714
[22] Filed Aug. 25, 1969
[45] Patented Nov. 23, 1971
[73] Assignee Control Data Corporation
Santa Ana, Calif.

[54] COMPUTER COMMUNICATIONS SYSTEM
7 Claims, 7 Drawing Figs.

[52] U.S. Cl. .......... 340/172.5
[51] Int. Cl. .......... G06f 15/16
[50] Field of Search .......... 340/172.5; 235/157

[56] References Cited

UNITED STATES PATENTS

| | | | |
|---|---|---|---|
| 3,312,954 | 4/1967 | Bible et al. | 340/172.5 |
| 3,374,465 | 3/1968 | Richmond et al. | 340/172.5 |
| 3,377,623 | 4/1968 | Reut et al. | 340/172.5 |
| 3,409,877 | 11/1968 | Alterman et al. | 340/172.5 |
| 3,411,139 | 11/1968 | Lynch et al. | 340/172.5 |
| 3,444,528 | 5/1969 | Lovell et al. | 340/172.5 |

*Primary Examiner*—Gareth D. Shaw
*Assistant Examiner*—Ronald F. Chapuran
*Attorney*—Spensley, Horn and Lubitz

ABSTRACT: A computer controlled, data communications system is provided for transmitting data between a plurality of external devices. The system comprises up to eight, general purpose, digital computers, each with an associated disc-file storage system. The computers and the disc-file storage units are organized such that communication between the computers is made via the disc-file storage associated with each computer, not directly between the computers themselves. Each group of external devices is coupled to a primary and secondary computer such that upon the failure of the primary computer, the secondary computer will procss the data for its primary group of devices as well as for those external devices for which it is the secondary computer. Each disc-file storage unit is the primary storage for one computer and the copy storage for one additional computer. Upon the failure of a primary disc-file storage unit, a computer can operate with the copy storage unit.

INVENTORS.
MELVIN L. DOELZ,
ROBERT F. MARTIN,
FRED K. MORIOKA,

BY THEIR ATTORNEYS.
Spensley & Horn

INVENTORS.
MELVIN L. DOELZ,
ROBERT F. MARTIN,
FRED K. MORIOKA,
BY THEIR ATTORNEYS
Spensley & Horn

INVENTORS
MELVIN L. DOELZ,
ROBERT F. MARTIN,
FRED K. MORIOKA,

BY THEIR ATTORNEYS
Spensley & Horn.

COMPUTER COMMUNICATIONS SYSTEM

BACKGROUND OF THE INVENTION

1. Field of the Invention

The invention relates generally to the broad field of data communications systems, and more specifically to the use of digital computers as the transmitting medium between many external devices. The term "external device," as used herein, will be understood to include teletypewriters, selectric typewriter machines designed for data communications, digital computers and any other type of device which can transmit and receive data in a digitally coded format. The term "external devices" will also include the above machines whether they be local, i.e., within the same vicinity as the present invention system, or located at a remote site requiring communication via common carrier or private-line networks. In addition, a device can be a duplicate of the present invention system wherein the two systems communicate via a private or common carrier network using a high-speed modulator-demodulator (modem). An integral part of the present invention system is the disc-file storage. The storage system is used as the medium for intercomputer communication.

2. Prior Art

The field of data processing has long used computers to communicate between attached external devices. The basic problem inherent in all such systems is reliability. If an external device is connected to a computer which fails or is taken out of service for maintenance the attached external device is unable to be used. Since the typical computer which could be used for this type of task would be a stored-program digital computer, the additional element of program failure is also a factor. As a general rule, the great majority of computer controlled, data communication system downtime is due to machine hardware failure, routine maintenance and program failure. The term "downtime" is understood to mean that period of time during which data communication is at a halt.

In recent years the data processing industry has introduced larger machines with the obvious increase in reliability problems. Since the machines are larger, the greater number of electronic circuits increases the probability of hardware failure. Synonymous with the presence of larger machines is the requirement of larger programming or software systems. The increase in both hardware and software leads to a greater probability of failure.

A typical computer installation used for data communication purposes will be comprised of a single large-scale, general-purpose digital computer, various types of external devices to be interfaced to the computer and a device control unit to provide the computer-device interface. The devices can be any of a variety of available units, e.g., teletypewriters, electronic accounting machines and computers, each of which may be locally or remotely situated. The external devices can use any of a variety of digital codes, operate at different speeds and may have different communication goals and requirements. The focal point of the communication problems is the computer, but the interface control unit is of equal importance. It is obvious that a computer failure will result in downtime, but a device control unit failure will give an equivalent and equally derogating result.

The alternatives taken to solve the reliability problems have been overly expensive, inefficient or both. The most basic approach revealed by the prior art is redundancy. By duplicating the system components, it is obvious that the reliability of the system will be increased, but the benefit is gained at the expense of excessive cost. A second approach is the use of a complete standby system. This may be justified in areas where downtime is critical, but this is merely an expanded version of redundancy techniques. By completely duplicating a system and using it as a standby unit, reliability problems are greatly reduced, but efficiency and cost effectiveness have been sacrificed. A variation of the standby technique is the use of a second computer as a standby unit, but the standby unit is given a function independent of the data communications system, e.g., batch processing. Upon the failure of a data communications processor, the standby unit is switched over to the primary communications task. This technique has an advantage over the pure standby technique as the standby unit is carrying out specific tasks while on standby status. The problems inherent in program switchover time and duplication costs are still present.

The present invention system solves this problem by utilizing a plurality of general purpose digital computers, each servicing some portion of the total number of devices. Identical programs operate in each processor, and upon the failure of a processor or a disc-file storage system, the functions normally executed by the inoperable unit will be executed by another processor or disc-file storage system respectively.

An integral part of the data communications system is the bulk storage medium. Bulk storage shall be understood to mean data storage facilities other than the computer's internal memory system. Since a data communications system is intended to process a large number of messages being transferred between devices, the size of the bulk storage facilities must be sufficient to handle the traffic, be fast enough to provide efficient communications and be within reasonable cost limits. Disc-file storage or drum storage systems have been used to solve this problem. The critical area of concern is that of speed. Since rotating memory systems are inherently slower than the computer due to positional requirements and physical limitations, the disc or drum system is the limiting factor in system efficiency. The prior art has offered solutions to this problem by permitting the control unit of the rotating storage system to accept multiple requests but the requests are handled in a queue, i.e., first in, first serviced. Servicing a queue makes inefficient use of a rotating storage system in that the request to be serviced bears no fixed relationship to the accessible data.

The present invention system solves this problem in that the requests are serviced in relation to the accessible memory location, not the order in which the requests were received. By this method, the use of the rotating storage unit is maximized thereby utilizing the slowest element of the system at the greatest possible efficiency.

SUMMARY OF THE INVENTION

The purpose of this invention is to provide a computer-controlled data communication system which will provide maximum reliability while possessing operational efficiency and cost effectiveness.

The data communication system utilizes at least two small, general-purpose digital computers. The number of computers used will be dependent upon the number of external devices which will require service and the device capacity of each computer. Each computer in the system will be connected to a group of external devices through interface line modules. The line module must be capable of transmitting and/or receiving data pursuant to the requirements of the external device. The device can be a teletypewriting machine, a computer, another data communication system, or any other device capable of transmitting and/or receiving data in a digital format. The line module is also used to scan all input and output lines and provide temporary memory storage for received data prior to the data being stored in the computer's internal memory system.

Each of the digital computers, or processors, is designated the primary computer with reference to a group of external devices. This indicates that the primary computer will process all data received from or to be transmitted to the group of external devices so long as that computer continues to be operable. Another computer within the system is designated the secondary computer with reference to the group of external devices associated with the above primary computer. The secondary computer is connected to the line modules associated with the primary computer and its group of external devices. In this configuration, each computer in the system is designated the primary and secondary computer with regard to two groups of external devices. When all computers are operable, the data received by a line module will be transferred to both the primary and secondary computer, but only the primary computer will service the external device.

Because of the variety of external devices which could be connected to the present invention system, a distinction is made between external devices, the distinction based upon their input and output characteristics, i.e., how data are transmitted to and from the external device. When the transmission characteristics of an external device are such that the message is generally short in duration and is of the type which can be requested again without a loss of data, the device is designated a "controlled device." An example of a controlled device is a digital computer. Where a data transmission would generally be lengthy and not necessarily dependent on the computer's current status, i.e., input or out-put the external device is designated a "noncontrolled device." An example of a noncontrolled device is a telemetry system.

The treatment given input messages by the primary and secondary computer are different, the difference based on whether or not the device is controlled or noncontrolled. The primary computer will process all received data without reference to the device designation other than the specific code, speed or data processing requirements. Since the secondary computer will have to initiate input data processing for the devices upon a failure of the primary computer, the device designation is important. Since a controlled device can be requested to retransmit a message which was lost during the switchover, no data received by the secondary computer from a controlled devices stored by the secondary computer. In the case of noncontrolled devices, a predetermined number of messages are continuously stored by the secondary computer, but if a failure of the primary computer does not occur within the time period allocated for receipt of the predetermined number of messages, the next message received will cause the secondary computer to purge the oldest message (with respect to time) from storage.

All computers in the system operate with identical programs. The programs can be said to have no memory in that all subroutines executed are dependent upon the particular device being serviced and therefore are referenced by tables. The operating, or executive programming system is the same for all computers. The only difference in the program routines used are those which relate to the service of specific devices. Since these are merely program modules which would be used by a computer if and when that specific device is connected to the computer, the operating system for each computer can be considered identical.

Processors can service all devices with respect to which they are designated the primary or secondary computer. When a primary computer fails or is taken out of service for routine maintenance, the secondary computer will process the data received from and to be transferred to those devices for which it is the secondary computer, as well as process data from those devices for which it is the primary computer. The present invention system provides for continuous data processing so long as there is not a concurrent failure of the primary and secondary computer associated with the group of devices. Upon a failure of a primary computer, one of the operating computers is servicing two groups of devices, therefore the speed of service will be degraded, but there is no catastrophic failure as would be the case with the systems disclosed by the prior art. Even where a primary and secondary computer associated with a specific group of external devices become inoperable, only the single group of external devices is taken out of service.

Since the system must provide communication between devices, intercomputer communications must be established. A rotating storage system is used, with each computer being assigned a disc-file storage system which is used to store processed messages and programs. The storage system assigned to a computer is designated the primary storage system. The disc-file channel of each computer is connected to all disc-file storage systems. In addition to the primary storage, each computer is assigned a copy storage system physically located in another disc-file. Therefore, each disc-file storage system associated with a computer contains a primary storage area and a copy storage area. The combination of a primary and copy storage allocated to a computer and the disc-access controller allowing access to both storage areas is designated the "logical disc-file system." The logical disc-file system is understood to be that storage which will be used to store all message data and programs used by a specific computer without reference to a physical disc-file system. The combination of a group of external devices, a computer and logical disc system shall be understood to constitute an exchange unit.

A request bus and a data bus interconnect each computer with each disc-file storage system. The request bus is used to transmit data requests or other special commands to the disc-access controller to store a predetermined number of requests. The requests are scanned periodically to determine whether or not a request has been made to store data in or retrieve data from the next accessible data sector. A data sector is understood to be that segment of disc storage defined by some predetermined addressable limits. When the disc-access controller finds a request to execute, it turns control over to the disc channel of the computer which issued the request. As a general rule, a disc-access controller will accept a write command only from those computers for which it is the primary or copy storage. Any computer can read data from any storage unit.

One of the essential purposes of a copy storage area is to allow for the failure of one or more of the primary storage systems. When the primary storage assigned to a designated computer has failed or is taken out of service, the copy storage will be utilized as the sole source of bulk storage. Under conditions where all storage systems are operable, a computer may access one or both of the primary and copy storage areas. In a data retrieval operation, typically both storage areas will be accessed with the first available area being read. If an error is detected during the read operation, the other storage area will be read. Upon successfully reading the alternate storage area, the computer will attempt to restore the initially accessed data area by writing the proper data into that data area. In a write operation, data are written into both the primary and copy storage areas, with the operation being terminated only upon the successful transfer to the last accessible area. In a case where one of the storage areas becomes inoperable, the physical storage system containing the remaining operable area, i.e., the logical storage system, may be under an increased load. The storage system will have to service all requests for that which it is the primary storage system, and in addition service all requests for copy storage. If it was a failure of a primary storage area, the load on the copy storage could degrade the overall system performance. Since the storage system is a rotating system, access time is not affected, but the speed of servicing requests will be decreased. The disc access controller can store only a finite number of requests, therefore since the copy storage is being utilized, degraded service will result. The invention fulfills the purpose of reliability by preventing catastrophic failure when a storage system fails or is otherwise rendered inoperable. Unless a situation occurs where both the primary and copy storage allocated to an exchange unit are inoperable, the system will continue to function. The only effect of the failure is degraded service.

A computer will transmit data to another computer by transmitting a special request to the logical disc storage system associated with that computer. Upon recognition of the special request, the other computer is interrupted and is given the address of the transmitting computer. The computer which received the special request will then send a read request to the logical disc system associated with the transmitting computer, requesting the message. By this procedure, no computer will have to directly interrupt any other computer, therefore the slowest element of the system, the disc-file storage system, will initiate all transfers and thereby be operated at maximum efficiency.

The novel features which are believed to be characteristic of the invention, both as to its organization and method of operation, will be better understood from the accompanying drawing in which a presently preferred embodiment of the invention is illustrated by way of example. It is to be expressly understood that the drawing is for the purpose of illustration and description only, and is not intended as a definition of the limits of the invention.

DESCRIPTION OF THE PRESENTLY PREFERRED EMBODIMENTS

Figure 1:
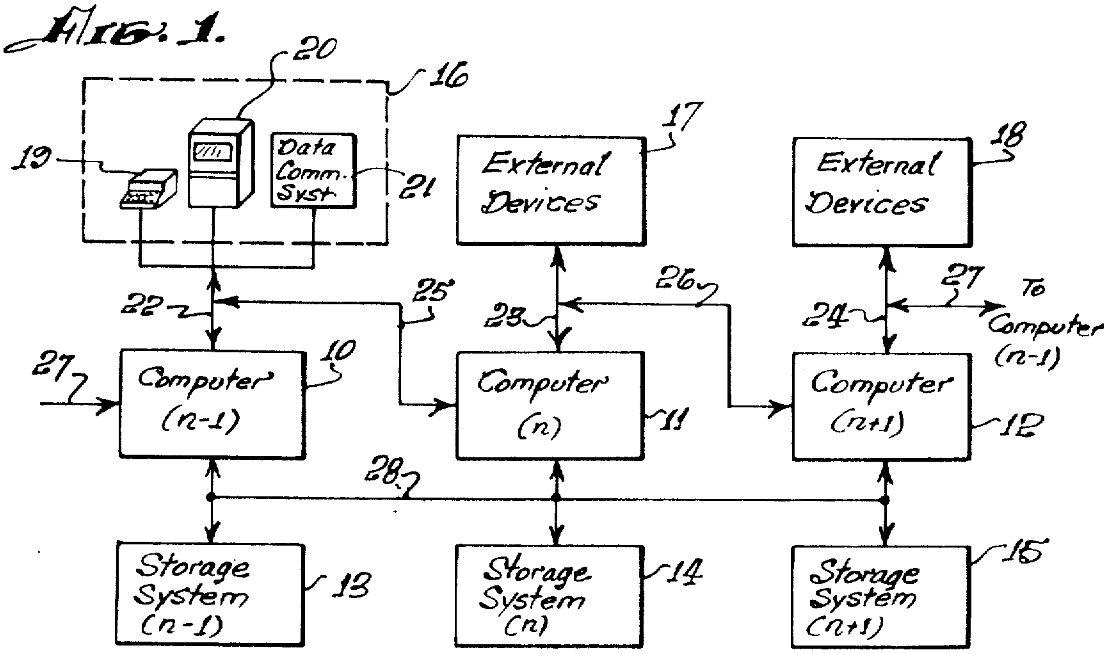
FIG. 1 is a schematic diagram in block form of a computer-controlled data communication system organized in accordance with the present invention.

Referring to FIG. 1, a system comprising three exchange units is shown. Computer($n$—1) 10, computer($n$) 11, and computer $n$+1) 12 are digital computers, all the small general purpose class of computers. The computers used can be selected from known, commercially available computers, but are preferably Marshall Communications M-1000 computers. Although the embodiment shown in FIG. 1 uses only three computers, and therefore three exchange units, the maximum number is limited only by the capability of the computers and the associated storage systems.

Computer($n$—1) 10 is connected to a group of external devices 16 via line 22; computer($n$) 11 is connected to a group of external devices 17 via line 23; computer($n$+1) 12 is connected to a group of external devices 18 via line 24. The devices to be included within the group of external devices 16, 17 and 18 can be any devices which can transmit and/or receive data in a digital format. The group of external devices 16 presents an example of typical units, e.g., teletypewriter 19, digital computer 20 and data communication system 21. The external devices used can be located in the vicinity of the present invention system (local) or be situated at a different site (remote). When all computers are operable, computer($n$—1) 10 is designated the primary computer with respect to the group of external devices 16, computer($n$) 11 is designated the primary computer with respect to the group external devices 17 and computer ($n$+1) 12 is designated the primary computer with respect to the group external devices 18.

A computer is designated as the primary computer because a secondary, or backup, computer is assigned to each of the groups of external devices 16, 17 and 18. A secondary computer will be adapted to execute all functions being executed by the primary computer, the switchover occuring when the primary computer fails or is otherwise taken out of service. Computer($n$) 11 is a secondary computer with respect to the group of external devices 16. Computer($n$+1) 12 is the secondary computer with respect to the group of external devices 17. Computer($n$—1) 10 is the secondary computer with respect to the group of external devices 18. When a designated secondary computer is executing the processing functions of the primary computer, computer($n$) 11 will transmit data to and receive data from the group of external devices 16 via line 25; computer($n$+1) 12 and computer($n$—1) 10 will transmit and receive data on lines 26 and 27 respectively. Since the adaptation of a secondary computer to execute the processing functions of a primary computer is basically a transfer of control, it will be understood that all processing functions comprise a "control function." In other words, when computer($n$—1) 10 is executing all processing functions associated with the group of external devices 16, control function ($n$—*1*) is active in computer($n$—1) 10. When computer($n$11 is adapted to execute the processing functions of computer($n$—1) 10, control function($n$—1) has switched and therefore become active in computer($n$) 11. The use of a secondary computer makes the present invention system a closed loop system. Using the case shown in FIG. 1, a three exchange unit system is a closed loop of three exchange units wherein a secondary computer is available for activation upon the failure of any primary computer.

Since an object of the present invention system is reliability, a computer may simultaneously execute two control functions. When a control function is being executed by a secondary computer, there will be a degradation of service because of the increased number of computer instructions being executed, but the system will continue to service all devices. Service to a group of external devices will be discontinued only when the control function associated with a group of external devices cannot be executed, i.e., both the primary and secondary computers have failed.

Each of the computers 10, 11 and 12 will be connected to an equal number of storage systems 13, 14 and 15. Although the computers 10, 11 and 12 can communicate with all of the storage systems 13, 14 and 15, a physical storage system is assigned to each computer. The storage system used can be any type of commercially available bulk storage system, but for cost objectives it will preferably be a rotating storage system, e.g., rotating disc-file or drum. In the presently preferred embodiment illustrated in FIG. 1 the storage systems 13, 14 and 15 are disc-file storage systems. The computers 10, 11 and 12 communicate with the storage systems via the logical bus 28.

Figure 2:
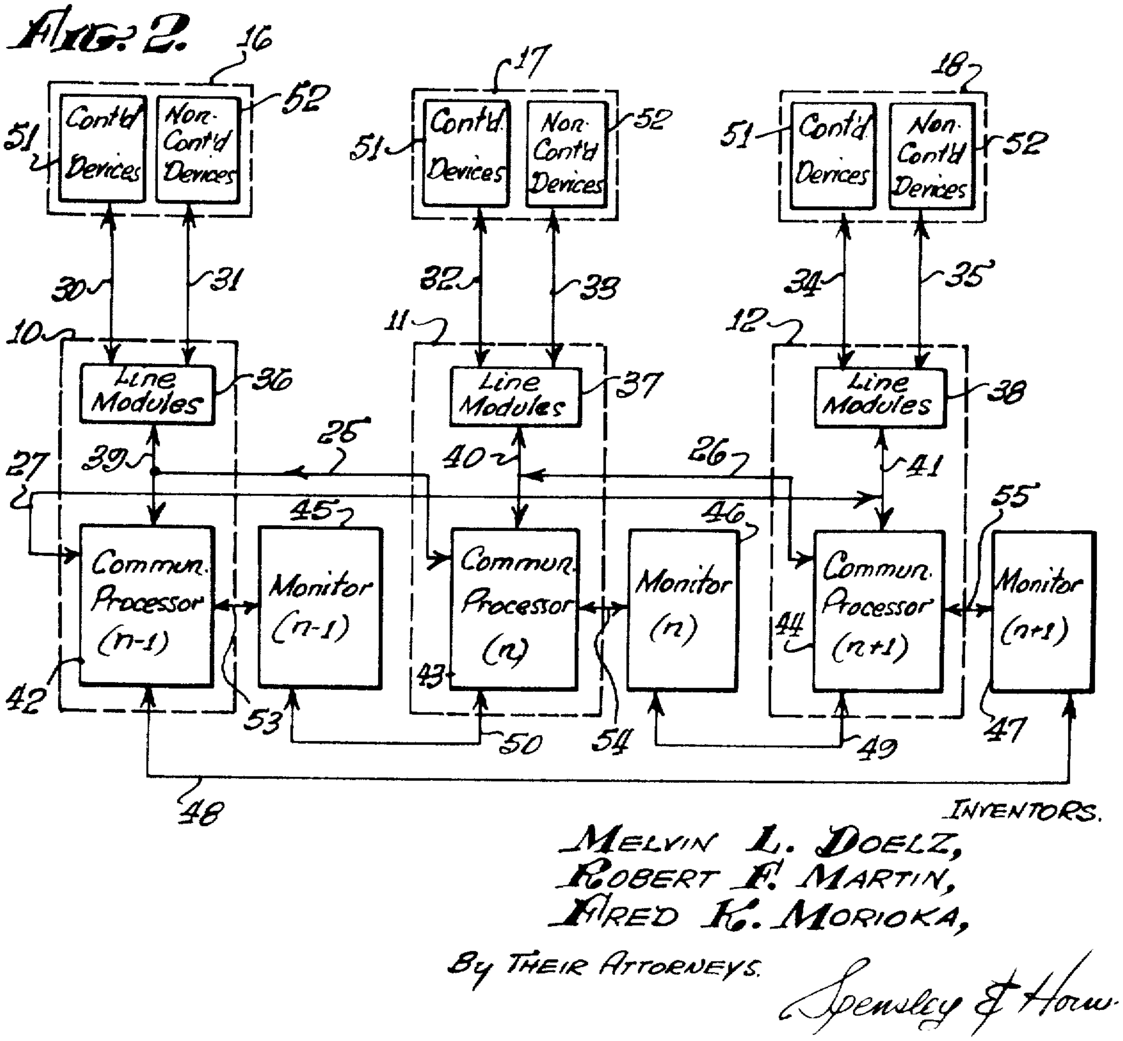
FIG. 2 is a schematic diagram in block form of the input-output system of a preferred embodiment of the present invention system.

Referring now to FIG. 2, an expanded view of the external device-computer input/output system of the present invention system is shown therein. As discussed above, any device which can transmit or receive data in a digital format can be serviced by the present invention system, therefore a proper distinction must be made between devices. Devices can be either controlled or noncontrolled. A controlled device 51 is one which will operate synchronously with the modes (input or output) of the system and therefore can be requested to retransmit a message. A typical example of a controlled device 51 is a punched card reader. A noncontrolled device 52 is one which can transmit data at any time with a resulting loss of data if the message is not received and stored by the present invention system. A typical example of a noncontrolled device is a telemetry system.

The computer($n$—*1*) *10 is interfaced to the controlled devices 51 and the noncontrolled devices 52 via lines 30 and 31 respectively. The devices can be located either remotely or locally, with the result line modules 36 are required. A local device is one which is within the vicinity of the computers 10, 11 or 12 and which can be connected to the computer 10, 11 or 12 through the use of short distance modems. A remote device is one which requires the use of common carrier or private communication networks and the corresponding long distance modems. The line modules 36 provide the line interface for the group of external devices 16. The line modules 36 scan the input and output lines 30 and 31 connecting the group of external devices 16. The line modules 36 temporarily store the received data before they are transferred to the communications processor*($n$—1) 42 via line 39 and the data to be transferred to the group of external devices 16. Computer($n$—*1*) 10 is comprised of line modules 36 and communication processor($n$—*1*) 42. Line modules 37 interface lines 32 and 33 and execute the interface functions prior to transferring the received data to communications processor($n$) 43 via line 40 or transferring data to the group of external devices 17. Computer($n$) 11 is comprised of line modules 37 and communication processor($n$) 43. Line modules 38 interface lines 34 and 35 and execute the interface functions prior to transferring the received data to communication processor($n+1$) 44 via line 41 or transferring data to the group of external devices 18. Computer($n+1$) 12 is comprised of line modules 38 and communication processor($n+1$) 44. All of the groups of line modules 36, 37 and 38 also provide the hardware interface to transfer data to the external devices 16, 17 and 18.

Line modules 36, 37 and 38 are conventional interface devices used to provide an electronic interface to such conventional equipment as teletypes and data communications systems. The manner of interfacing the typically serial data transmissions from such external devices, and converting same to the particular word length and signal requirements as required by the particular computers selected to implement the present invention are well known to those having skill in the art, the specific manner of implementing line modules 36, 37 and 38 not being part of the present invention. See Buckholtz, W. *Planning a Computer System*, Page 188, McGraw-Hill, New York, 1962.

As discussed above, when all computers are operable, a control function is active in each computer, i.e., all computers are executing the processing functions necessary to service the respective devices. Under these conditions, control function($n-1$), hereinafter defined as CFN−1, is active in computer($n-1$) 10, control function($n$), hereinafter defined as CFN, is active in computer($n$) 11, and control function($n+1$), hereinafter defined as CFN+1, is active in computer($n+1$) 12.

All of the computers which make up the present invention system are operated by a programming system which will be understood to be an executive system. The executive system determines when devices are to be serviced, what program subroutines are to be executed, and in general carry out all tasks necessary to fulfill the task of the system. All computers operate with the same executive system. The advantages gained by this are simplicity and reliability. Each exchange unit is considered to be identical with each other exchange unit but for the specific devices being serviced. As a result, the individual program modules needed to service a specific external device may differ from exchange unit to exchange unit, but the executive system required to activate and utilize all program modules is the same irrespective of the exchange unit.

The present invention system can utilize any software package which can fully utilize the structural capability of the system. Many varieties of programs can be implemented to permit the present invention system to carry out its intended function, the specific manner of implementing the executive system not being part of the present invention.

A monitor unit is connected between each primary and secondary computer to store and provide status information as to the operating status of the pair of computers and their associated storage systems. Monitor($n-1$) 45 transfers status information to and receives status information from computer($n-1$) 10 via line 53; monitor($n$) 46 transfers status information to and receives status information from computer($n$) 11 via line 54; monitor($n+1$) 47 transfers status to and receives status information from computer($n+1$) 12 via line 55. When the present invention system is activated, the control functions are generally initialized in the primary computers. Computer($n-1$) 10 via line 53, computer($n$) 11 via line 54 and computer($n+1$) 12 via line 55 transmit signals to their respective monitors 45, 46 and 47 to indicate initialization. The signal will be repeated at a predetermined interval to insure an operating status at the monitor. If the monitor "-times out," it is indicative that a control function is no longer active, i.e., the computer has failed or has otherwise been rendered inoperable. "Time out" is understood to mean that the predetermined interval between status signals has been exceeded.

When monitor($n-1$) 45 times out, CFN−1 is no longer active in computer($n-1$) 10, therefore a signal is transmitted to computer($n$) 11 on line 50 to activate CFN−1 in computer($n$) 11. If computer($n$) 11 is operable, both CFN−1 and CFN will be operating simultaneously in computer($n$) 11. To reiterate, computer($n$) 11 will be performing all of the precessing functions necessary to service the group of external devices 16 and the group of external devices 17. If computer($n$) 11 is not operable, monitor($n-1$) 45 will not receive a status signal from computer($n$) 11, whereupon monitor($n-1$) 45 will signal computer($n-1$ 10 to attempt to reactivate CFN−1 in computer($n-1$) 10. The monitor($n-1$) 45 will continue to alternate activation signals until the control function is either started or it is manually shut off. If monitor($n$) 46 times out, it will transmit a signal on line 49 to computer($n+1$) 12 to activate CFN in computer($n+1$) If monitor($n+1$) 47 times out, it will transmit a signal on line 48 to computer($n-1$) 10 to try to activate CFN+1 in computer($n-1$) 10.

If a computer fails, and the control function is operating in a secondary computer, the external devices primarily assigned to the inoperative computer will be serviced by the secondary computer. In FIG. 2, when CFN−1 is operating in computer($n$) 11, the group of external devices 16 will be serviced via line 25. If CFN is operating in computer($n+1$) 12, the group of external devices 17 will be serviced via line 26. If CFN+1 is operating in computer($n-1$) 10, the group of external devices 18 will be serviced via line 27. Prior to the failure of a primary computer, a predetermined number of messages from the noncontrolled devices 52 are queued by the secondary computer. The manner of queueing messages can be by conventional means such as storing same in conventional shift registers or memory locations. The manner of storing data is well known to those having skill in the art, the specific manner in which a predetermined number of messages from the noncontrolled devices 52 can be stored is not a part of the present invention. See Buckholtz, W., *Planning a Computer System*,McGraw-Hill, New York, 1962. Upon the failure of the primary computer, the control function will be activated in the secondary computer, and since the messages from the noncontrolled devices have been queued, no loss of data will occur. When the control function is activated in the secondary computer, the controlled device 51 will be requested to retransmit those messages which were lost.

Figures 3, 4, 5:
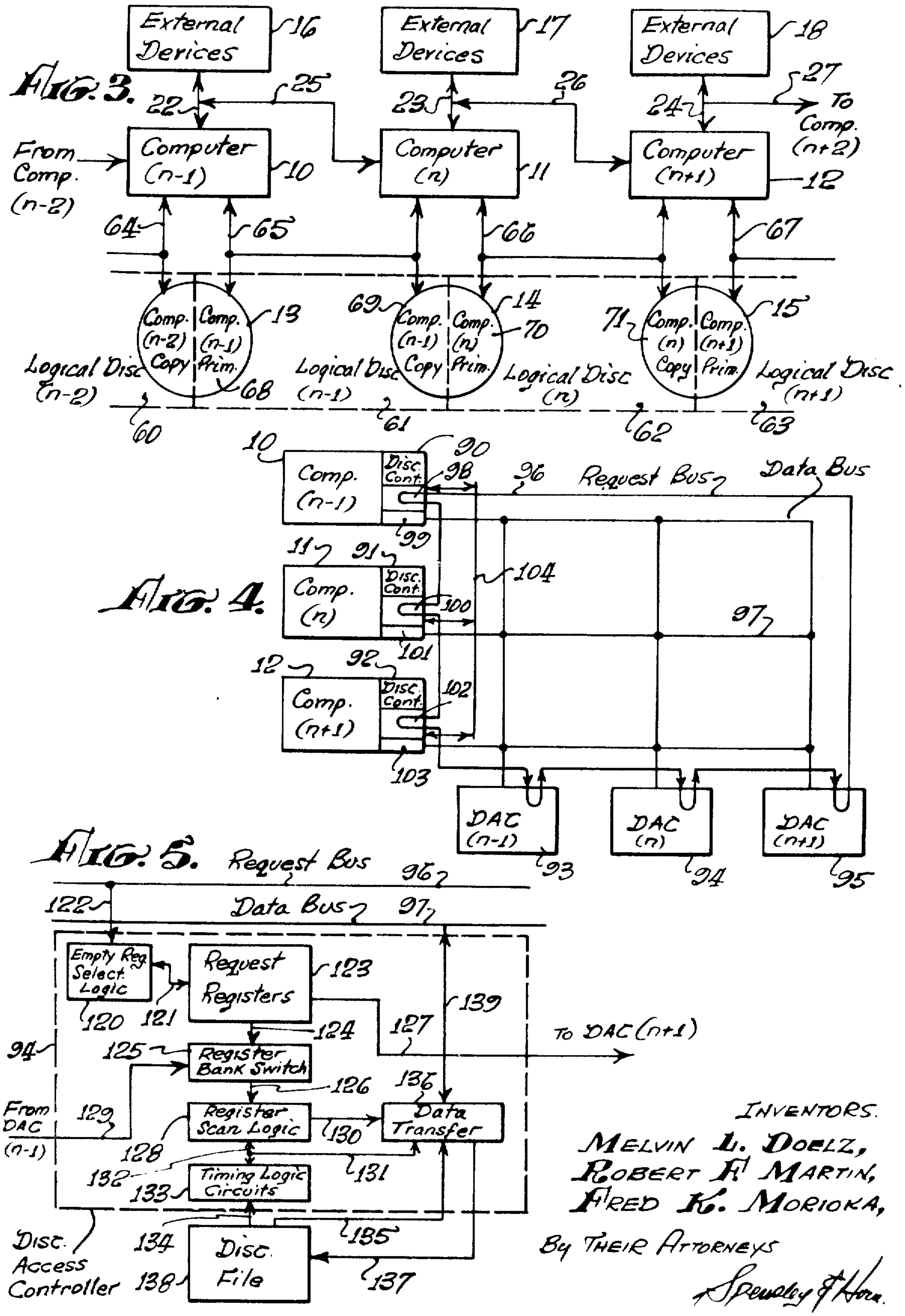
FIG. 3 is a schematic diagram in block form of an alternative embodiment of a computer-controlled data communication system organized in accordance with the present invention.
FIG. 4 is a schematic diagram in block form of the data and command matricies of a computer-controlled data communication system organized in accordance with the present invention.
FIG. 5 is a schematic diagram in block form of a disc-access controller made in accordance with the present invention.

The principle of the "logical disc system" is best understood by reference to FIG. 3. Although a physical storage system is assigned to each computer, the object of reliability demands a more efficient organization. FIG. 3 illustrates a presently preferred embodiment of the present invention system wherein three complete exchange units are shown. If line 67 was connected to line 64 the embodiment would be a closed three exchange-unit system. To reiterate, an exchange unit is understood to mean a group of external devices, a data processing computer, and a logical disc system, e.g., external devices 16, computer($n-1$) 10, logical disc($n-1$) 61. As discussed previously, the storage system is a rotating storage system because of operational and cost efficiency, and in this case, preferably being a disc-file.

Each of the computers in the present invention system is assigned a physical disc-file storage system. Physical disc-file storage systems 13, 14 and 15 are assigned to computer($n-1$) 10, computer($n$) 11 and computer($n+1$) 12 respectively. A logical disc comprises a primary storage area and a copy storage area, the two areas being on two separate physical disc storage systems. The primary storage area 68 for computer($n-1$) 10 is located in physical disc file 13 and the copy storage area 69 is located in physical disc file 14. The primary storage area 70 for computer($n$) 11 is located in physical disc file 14 and the copy storage area 71 is located in physical disc file 15. When CFN−1 is operating in computer($n-1$) 10, or computer($n$) 11, it can access logical disc($n-1$) 61 via line 65. When CFN is operating in computer($n+1$) 12, it can access logical disc($n$) 62 via line 66. Logical disc($n-2$) 60 and logical disc($n+1$) 63 are shown in the generalized case of an expanded exchange unit system.

A control function is capable of executing instructions to access the primary storage area, copy storage area, or both areas. When data are to be stored, the instruction will specify the storage area. When data are to be stored in both storage areas of the logical disc, the transmission will continue until both areas have been written into. This is necessary because the physical disc files 13, 14 and 15 run asynchronously with respect to each other. When data are being retrieved from a logical disc, unless a specific area is selected, the transmission will be terminated after retrieval from the first accessible storage area. The manner of terminating transmission from a disc file is well known to those having skill in the art. The mere generation of a termination pulse upon reaching the end of addressed data locations, i.e., end of file, end of record, etc., can be accomplished by conventional means, the implementation of a circuit for producing a termination signal not being part of the present invention. If a parity error occurs upon retrieval from the first accessible storage area, the data will be retrieved from the alternate storage area. Upon the completion of a valid retrieval operation, the computer will attempt to restore the data area which yielded the erroneous data, restoration being accomplished by rewriting into the data area. The control function as described herein is the supervisory function over the present invention system. The supervisory system can be implemented by a direct wired system or through the use of conventional programming systems, the manner of implementing same being within the knowledge of those having skill in the art given the structure of the present invention system. The control function merely provides a motive force to the structure defined for the present invention system, a motive force inherent in all digital computer systems.

FIG. 4 illustrates a typical data exchange network comprised of three exchange units. Although not shown, all of the computers are connected to external devices. When data are retrieved from, or are to be transferred to an external device, the computer must communicate with one or more disc storage systems for executing the retrieval of nonresident program modules, data transfers or both.

The disc controllers 90, 91 and 92 serve as the hardware interface between the computers 10, 11 and 12 and the disc access controllers 93, 94 and 95. The disc controllers 90, 91 and 92 are logically divided into functional units, i.e. the request section which transmits disc requests to a logical disc system and the data section which transfers data between the disc and the respective computer memory. The request sections 98, 100 and 102 of each disc controller 90, 91, and 92 are connected to a common request bus 96. In the embodiment of the present invention system illustrated in FIG. 4, the three exchange units share the common request bus 96. The request bus 96 is the common transmission line by which any disc controller transmits requests to any logical disc system.

When the control function operating in computer($n-1$) 10, computer($n$) 11, or computer($n+1$) 12 requests a data transfer, the request section of the disc controller 90, 91 or 92 respectively will activate an output signal on control line 104 informing all other request sections it wants to use the request bus 96. Prior to using the request bus 96, request section 98, 100 and 102 will test control lines 104 to determine whether or not the request bus 96 is in use. If the request bus 96 is free, the initiating request section 98, 100 or 102 will raise its requesting signal on control lines 104. Since contention for the request lines must be minimized after the request signal is raised, the control lines 104 are again tested to make certain there is no contention for use of the request bus 96. When the request bus 96 is secured for use, the disc controller 90, 91 or 92 will transmit the request data to the appropriate disc assess controller 93, 94, or 95 and then deactivate the request bus 96 and the control lines 104.

When all equipment is operable, all computers can write only into the logical disc so assigned to that computer and read from any disc system. Computer($n-1$) 10 will transmit data to disc assess controller($n-1$) 93 by initiating a request at disc controller 90. The request section 98 of disc controller 90 will test control lines 104 to determine whether or not request bus 96 is free. Computer($n$) 11 will transmit data to disc assess controller($n$) 94 by initiating a request at disc controller 91. The request section 100 of disc controller 91 will test control lines 104 to determine whether or not request bus 96 is free. Computer($n+1$) 12 will transmit data to disc assess controller($n+1$) 95 by initiating a request at disc controller 92. The data section 102 of disc controller 92 will test control lines 104 to determine whether or not the request bus 96 is free. If a retrieval operation is requested, any computer can access any disc storage system.

The request data comprises:

1. the type of service;
2. mode of operation;
3. sector address to be accessed;
4. disc on which selected sector is located;
5. requesting exchange unit;
6. tag number; and,
7. status of control function.

The type of service defines a read, write, or special control command. The mode of service defines whether the data transfer is to be carried out in the primary storage, copy storage, or both. The sector number will be required so that the disc access controller can determine whether or not there is a requested data transfer for the next accessible sector. The disc number is required because each disc system has a plurality of discs limited only by considerations not relevant to this discussion. The processor which requested the data transfer must be identified so that a computer signal can be sent to the proper computer. The tag number will relate a specific request with a specific portion of a computers internal memory system. Since a computer can issue a plurality of requests, the control function must be able to correlate a completion signal with a specific request. The control function status indicates the computer within which the control function is active. If computer($n-1$) 10 is inoperable, CFN−1 will be operating in computer($n$) 11, therefore this information must be included in the request data available to the particular disc access controller involved.

The disc controller data sections 99, 101 and 103 operate independently of the request section 98, 100 and 102 respectively. The data sections 99, 101 and 103 work in conjunction with the selected disc access controller 93, 94 or 95 to make the actual data transfer between the disc system and the computer memory. The data sections 99, 101 and 103 are able to control multiple data transfers during each revolution of the disc. The transfers are independent of each other and do not necessarily occur in the same order in which they were requested. In the system shown in FIG. 4, up to three disc access controllers 93, 94 and 95 would be transferring data, one at a time, to a given disc controller.

When a requested data sector becomes available, the disc access controller 93, 94 or 95 will send clock pulses, derived from a disc file timing track, to the proper disc controller 90, 91 or 92 on the data bus 97. The disc controller 90, 91 or 92 counts the pulses and synchronizes itself with the transmitting disc access controller 93, 94 or 95. The transmitting disc access controller 93, 94 or 95 transmits the tag number to the proper disc controller 90, 91 or 92 to enable the disc controller 90, 91 or 92 to correlate the data transfer with a prior request. In addition, the disc controller can be sent an indication of whether the data will be sent from the primary or copy storage of the logical disc, or under normal circumstances, that the data transfer will involve both halves of the logical disc. As mentioned previously, not all requisite data is sent with the request, therefore the disc controller 90, 91 or 92 must transmit to the disc access controller the track group address which in turn depends upon whether the specific disc controller is strapped to operate in the one, two or four track modes. The amount of data storage is the same for all modes, but the data transfer rate is twice or four times as fast respectively for the two and four-track modes. Actual data transfer occurs when the disc access controller 93, 94 or 95 starts sending data, one bit at a time serially from each track of the selected four-track group, over the data bus 97. When transmitting data to the disc file, after synchronization, data is sent two bits at a time to each track selected, i.e., in the one track mode, data is transmitted at half the serial rate, two bits at a time. The disc access controller 93, 94 or 95 receives data from the data bus 97 and reclocks the data and writes them onto the disc one bit at a time. When the data transfer is complete, the disc controller 90, 91 or 92 will interrupt the computer 10, 11 or 12 respectively.

To fully explain the operation of the disc access controller, attention should be directed to FIG. 5 which illustrates a functional block diagram of the disc access controller($n$) 94. To reiterate, in the presently preferred embodiment of the present invention system, up to eight exchange units can be utilized. The disc access controller($n$) 94 illustrated in FIG. 5 represents one disc access controller of a typical three-exchange unit system. Disc access controller($n$) 94 is shown enclosed by a dashed line and corresponds to that shown in FIG. 4. The request bus 96 furnished data to disc access controller($n$) 94 via line 122. The empty register select logic 120 is connected to the request registers 123 via line 121. Scanning pulses from the empty register select logic 120 are applied to the request registers 123. Request registers 123 are connected to the register bank switch 125 via line 124 and to the register bank switch of disc access controller($n$+1) 95 via lead 127. The data contained in the request register 123 or the request register of disc access controller($n$—1) 93 are transmitted to the register scan logic 128 via line 126 and by way of the register bank switch 125. The register bank switch 125 is connected to the request registers of disc access controller($n$—1) 93 via line 129 and to the register scan logic 128 via line 126. The timing and sector information is transferred from the disc file 138 to the timing logic circuits 133 via line 134. The timing logic 33 transfers the timing and sector information to the register scan logic 128 via line 132. The register scan logic 128 correlates the requests received by disc access controller($n$) 94 or disc access controller($n$—1) 93 with the next available data sector. The data transfer logic 136 receives request information from the register scan logic 128 via line 130, timing information from the timing logic 133 via line 131, and disc file data from the disc file 138 via line 135. When data is transferred to the disc file 138, the data is sent via line 137. The data transfer logic 136 communicates with the data bus 97 via line 139. Implementation of empty register select logic 120, request registers 123, register bank switch 125, register scan logic 128, timing logic circuits 133 and data transfer logic 136 is by conventional digital logic circuits. The manner of forming data registers, scanning registers for specific functions and comparing two registers for a decisional step is well known in the art. The specific manner of implementing the registers and logic described herein are by conventional means such as semiconductor logic circuits, the specific manner of implementing the circuits not being part of the present invention. See Richard, R. K., *Digital Computer Components and Circuits*, Von Nostrand, Princeton, 1959; Phister, M., *Logical Design of Digital Computers*, Wiley, New York, 1959.

When disc access controller($n$) 94 is selected by a disc controller 90, 91 or 92, the empty register select logic 120 must find an empty register among the request registers 123 and load the request into the empty register. The empty select logic 120 determines whether or not an empty register is available by examining the empty/full status of each of the request registers 123; the first empty register will be selected. If an empty register is not found, disc access controller($n$) 94 will not accept the request from the disc controller 90, 91 or 92. If an empty register is found, the disc controller 90, 91 or 92 will transmit the request data to disc access controller($n$) 94 over the request bus 96, and the empty register select logic 120 will cause the data to be loaded into the request register 123 via line 121. If the request constitutes a control command which will not occupy a register, the request register 123 will not be accessed by the empty register select logic 120.

The empty register select logic 120 must also inhibit improper requests. Under normal operations the inhibit functions will prevent a control function from writing into a logical disc other than its own. Disc access controller($n$) 94 is the control unit for the primary storage for CFN. The inhibit functions would be implemented to preclude other than CFN and CFN—1 from writing data, and each of these would be limited to their specific logical disc systems. Write requests from CFN or CFN—1 could be stored in request registers 123, but any write requests from CFN+1 would be rejected as illegal commands. In order for disc access controller($n$) 94 to know which control function has sent a request, a bit indicator is sent with the request data. The computer or exchange unit number would be insufficient since a control function can be active in either one of two computers. In the present invention system, each control function sends an indicator to indicate whether it is active in the primary computer, (primary computer is operable) or whether it is active in the secondary computer (primary computer is inoperable). Only CFN could write into the primary storage controlled by disc access controller($n$) 94, but CFN could be active in either computer($n$) 11 or computer($n$—1) 12. CFN—1 could write into the copy storage controlled by disc access controller($n$) 94, but CFN—1 could be active in either computer($n$—1) 10 or computer($n$) 11. The normal inhibits can be overridden by manual operation. The manner of implementing the inhibit function can be by conventional means such as the mere setting of a flip-flop or other binary device. The implementation thereof can either be by fixed wire or program implementation, the manner of setting a conventional inhibit function being well known to those having skill in the art.

The request registers 123 solve the access contention problem by creating a queue for the data requests. In the presently preferred embodiment, the numerical length of the queue is preferable sixteen registers but there is no fixed limit on the size of the queue. The size of the queue is limited only by the hardware used to implement the function, therefore the size of the queue can be increased or decreased. The requests which are accepted are transferred by the empty register select logic 120 to the request registers 123 via line 121. The request registers 123 store all requests from CFN to retrieve data from storage system($n$) 14, and will store all requests from CFN and CFN—1 for access to the primary and copy storage of storage system($n$) 14 respectively.

Once each sector time, the contents of the request registers 123 are scanned by the register scan logic 123 to determine whether or not there are any requests which require access to the next available data sector. The register bank switch 125 has access to the request registers 123 of disc access controller($n$) 94 via line 124 and the request registers of disc access controller($n$—1) 93 via line 129. The information from the 32 registers are accessible to the register scan logic 128 via line 126. Scanning always begins at a fixed time during each data sector and is always completed by the end of the same data sector. Once started, scanning continues until a request is found in the contents of request register 123 or those of disc access controller($n$—1) 93 or until all registers have been scanned once. During each scan period, the request registers 123 and those of disc access controller($n$—1) 93 are treated as a group of 32 registers and are scanned by the register scan logic 128 in disc access controller($n$) 94. The register scan logic 128 in disc access controller ($n$) 94 determines from request registers 123 whether there is a request to operate on its own primary storage area or any alternatively routed requests to operate on the copy storage of logical disc system($n$—1). The latter will occur when disc access controller($n$—1) 93 has failed; this will be explained in detail later in the discussion. In the event the primary disc file for logical disc system($n$—1) has failed, the register scan logic 128 will determine via the register bank switch 125 whether or not disc access controller($n$—1) 93 has a request for access to copy storage. The function of the register scan logic 128 is to maximize the use of the disc system and thereby increase the efficiency of the present invention system.

The disc file unit 138 transmits sector, origin and clock signals to the timing logic 133 via line 134. There are 64 sectors per revolution of the disc; the first 32 sectors following the origin signal are the primary storage sectors for CFN and the second 32 sectors constitute the copy storage sectors for CFN−1. The clock signal provides timing signals. The sector data transmitted to the register scan logic 128 via line 132 provides sufficient information to the register scan logic 128 to correlate a request with a sector position. The manner of reading a clock track from a rotating storage media and generating timing signals is a conventional procedure well known to those having skill in the art, the specific manner of implementing the read-heads and associated circuits not being part of the present invention.

The data transfer logic 136 interfaces the data bus 97 via line 139. A data transfer begins when a usable request is found by register scan logic 128. The exchange unit address is used to select the data bus 97, the address being transferred to the data transfer logic 136 via lead 130. When data are to be transferred to the exchange unit, the data transfer logic receives the disc-file data via line 135; timing signals are received from the timing logic 133 via line 131. When data are to be stored by the disc file 138, the data transfer logic 136 transmits the data to the disc file 138 via line 137.

Figure 6:
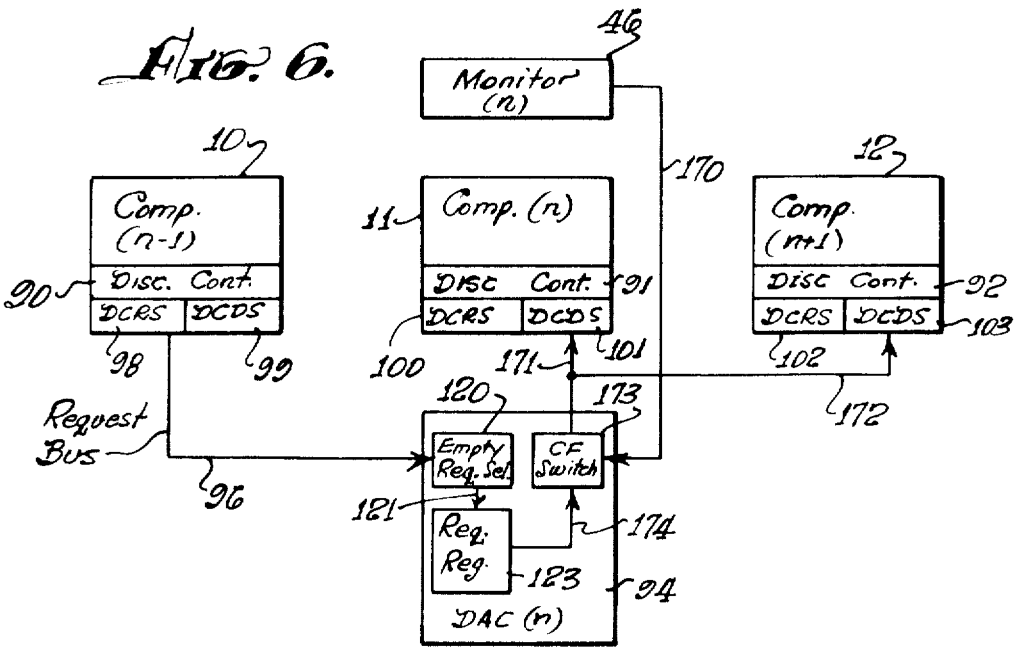
FIG. 6 is a schematic diagram in block form of the intercomputer transfer logic of the present invention system.

Since one of the prime objectives of the present invention systems is to transfer data between external devices in an efficient, reliable manner, the intercomputer communications process will be discussed. FIG. 6 illustrates a three exchange unit system wherein the intercomputer communication logic is shown in block form. If a message is to be transferred from computer(*n*−1 10 to computer(*n*) 11, the message must be stored in the logical disc system(*n*−1). Once the message is stored in logical disc system(*n*−1), a control function to control function interrupt request will be executed at computer(*n*) 11 after which computer(*n*) 11 will access logical disc system(*n*−1). As an alternative, a predetermined area of the logical disc system(*n*−1) could be periodically accessed by the other control functions to determine whether or not an intercomputer data transfer has been requested.

When the control function active in computer(*n*−1) 10 is required to interrupt the control function in computer(*n*), the disc controller request section 98 of disc controller 90 will initiate an interrupt to disc access controller(*n*) 94 over request bus 96. As shown in the discussion of FIG. 5, the empty register select logic 120 will determine whether or not an empty request register 123 is available, and if it is, it will transfer the control function to control function interrupt request to the request register 123 via lead 121.

Since the request is not one which required disc information, but is one which requires an address to be sent to computer(*n*) 11, the address identifying computer(*n*−1) 10 will be transferred to the control function switch 173 via line 174. CFN can be active in either computer(*n*) 11 or computer(*n*+1) 12 therefore it is not the computer which is the destination of the interrupt but the control function. It is the control function switch 173 which routes the address of the transmitting computer.

As mentioned in the discussion of FIG. 2, the monitor units gather sense data with respect to the operability of all computer and disc systems. Since the computer(*n*−1) 10 would have information which would indicate that computer(*n*) 11 is operable, and therefore consider CFN as active in computer(*n*) 11, the interrupt request would be sent to logical disc system(*n*). The monitor units also retain operating data as to the disc systems, i.e., disc access controller and disc files. In the case illustrated by FIG. 6, all component parts of exchange unit(*n*) are operable, therefore the monitor unit 46 will direct the control functions switch 173 in disc access controller(*n*) 94 to transmit the address to computer(*n*) 11. The information will be communicated to the control function switch 173 via line 170. If computer(*n*) 11 was inoperable, and therefore CFN was active in computer(*n*+1) 12, control function switch 173 would transmit the address data to computer(*n*+1) 12 via lead 172. Since computer(*n*) 11 is operable, the address of computer(*n*−1 10 will be transmitted to the disc controller data section 101 of disc controller 91 with the result computer(*n*) 11 will be interrupted. Once CFN has been informed that CFN−1 requires a data transfer, CFN can transmit a normal read request to logical disc system(*n*−1).

The intercomputer communication procedures discussed point out the problem of storage allocation. The transmitting exchange unit must be informed when the message has been taken by the other exchange unit. In the example illustrated by FIG. 6, computer(*n*−1) 10 must be able to free storage area in the logical disc system(*n*−1) after computer(*n*) 11 had received the message. All logical disc systems have predetermined storage areas allocated for intercomputer communication. The areas are designated as interexchange unit queues. When the receiving computer(*n*) 11 is interrupted and given the address data of computer(*n*−1) 10, CFN can directly access a known predetermined queue in logical disc system(*n*−1). CFN−1 maintains data as to the next message to be processed and the last message moved with regard to all interexchange unit queues. When the interexchange unit request is sent to computer (*n*) 11, CFN−1 will access a predetermined location on logical disc system(*n*) and read the last message moved from logical disc system(*n*−1). 1 When the data relating to the last message moved differs from that which CFN−1 maintains, the storage space occupied by the moved messages can be freed by CFN−1.

Figure 7:
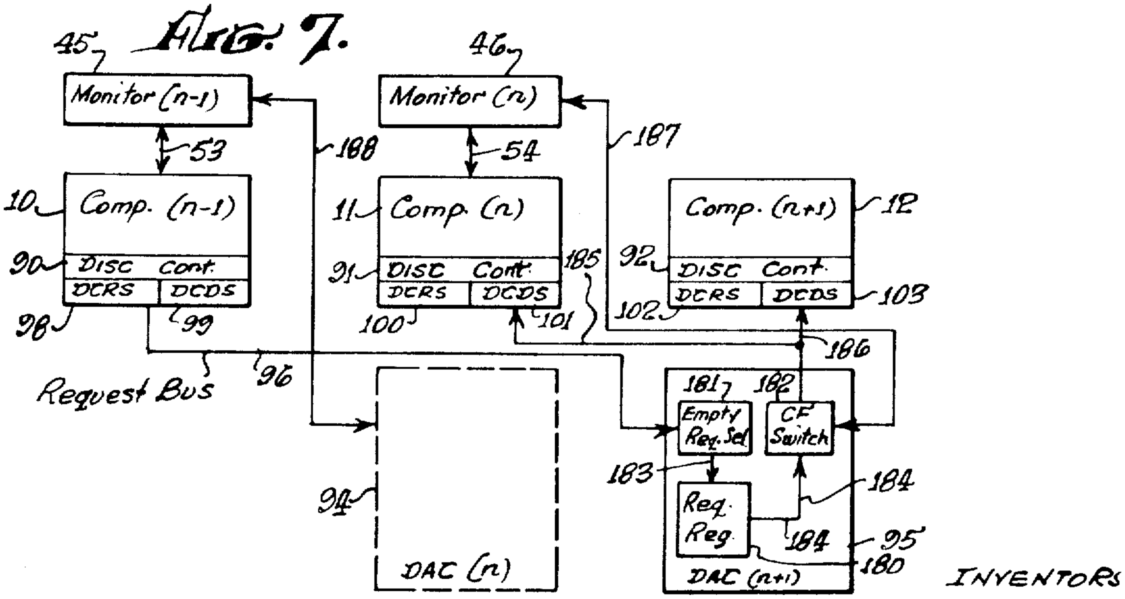
FIG. 7 is a schematic diagram in block form of another embodiment of the intercomputer transfer logic of the present invention system.

The cases of an inoperable computer or disc file storage have been covered in the preceding discussion; the operation of the present invention system upon the failure of a disc access controller can best be seen by reference to FIG. 7. FIG. 7 illustrates a three exchange unit system wherein the inoperable state of disc access controller(*n*) 71 94 is illustrated by the dotted line marked by reference number 94. When a message is to be transmitted from computer(*n*−1) 10 to computer(*n*) 11, the general procedure, as was seen from the discussion of FIG. 6, would be initiated by the transmission of a control function interrupt request to disc access controller(*n*) 94. Since, as assumed, disc access controller(*n*) 94 is inoperable, the interrupt must be rerouted.

The monitor unit(*n*−1) 45 receives the operating status of disc access controller(*n*) 94 via line 188, and the resulting status information is obtained by CFN−1 via line 53. The control function to control function interrupt request is initiated by CFN−1. The disc controller request section 98 of disc controller(*n*−1) 90 transmits the interrupt request to disc access controller(*n*+1) 95 via the request bus 96. Since CFN−1 has obtained the status indicating the inoperability of disc access controller(*n*) 94, the interrupt request is rerouted to disc access controller(*n*+1) 95. Disc access controller(*n*+1) 95 will accept request intended for logical disc system(*n*) since disc access controller(*n*+1) 95 will control access to the copy storage of logical disc system(*n*). The control function to control function interrupt request will be transmitted to the disc access controller(*n*+1) 95, and the empty request register logic 181 will determine whether or not an empty request register 180 is available. If a request register 180 is available, the control function to control function interrupt request will be transmitted to request register 180 via line 183. Since CFN can be operating in either computer(*n*) 11 or computer(*n*+1) 12, monitor unit(*n*) 46 will identify where CFN is active. The control function to control function interrupt request requires no data access, therefore the interrupt data will be transmitted to the control function switch 182 via line 184. The control function switch 182 receives the control function operating status from monitor unit(*n*) 46 via line 187, and from this data will route the interrupt request data to either computer(*n*) 11 via line 185 or computer(*n*+1) 12 via line 186.

The situation shown in FIG. 7 illustrates the case where the control functions are operating in the primary computers, and disc access controller(*n*) 94 is inoperative. The control function switch 182 will route the control function interrupt data to the disc controller data section 101 of disc controller 91, the data indicating the address of the transmitting exchange unit. When CFN receives the address of computer($n-1$) 10, it can then initiate a read request to logical disc system($n-1$) pursuant to the procedures outlined above.

If computer($n$) 11 was inoperable, CFN would be active in Computer($n+2$) 12 with the result the control function to control function interrupt request initiated by computer($n-1$) 10 would be routed to the computer($n+1$) 12. It can be seen that the messages intended for or received form the external devices for which computer($n$) 11 is the primary computer can be processed even though the primary computer and its associated primary storage are inoperable. The control function associated with the processing has been activated in another predetermined computer which will then use the copy storage of the logical disc system.

We claim:

1. A computer controlled data communications system for transmitting data between groups of external devices comprising:

a. at least a first and second stored program, electronic digital computer, said first computer being a primary computer for a first group of external devices and a secondary computer for a second group of external devices respectively, said second computer being a primary computer for the second group of external devices and a secondary computer for the first group of external devices;

b. first and second line interface modules responsive to the data of the first and second groups of external devices respectively and having input and output lines adapted to be received by said first and second computers whereby the groups of external devices are interfaced to said first and second computers;

c. first and second rotating storage units comprising 1. rotating data storage media having a timing track and data tracks segmented into a plurality of accessible data sectors; and
2. an access controller comprising:
   i. a timing module having an output signal responsive to the next addressable data sector on said rotating data storage media;
   ii. request registers having means for storing requests for access to said addressable sectors;
   iii. a register scan module connected to said request registers and said timing module, said register scanning module having means for comparing the output signal of said timing module and the contents of said request register and outputting a signal when there is a request for the next data sector;
   iv. a data transfer module connected to said storage media and said timing and register scanning modules, said data transfer module having an output signal which is a function of the data stored in the data sector indicated by the output signal of said register scanning module; and d. first and second monitors responsive to the operating status of said computers and storage units, said first monitor having an output signal to inform said second computer of the mode of operation of said first computer and said second monitor having an output signal to inform said first computer of the mode of operation of said second computer.

2. A data communications system as defined in claim 1 wherein each of said access controllers includes a register bank switch connected to said request registers of said access controllers and providing an output signal responsive to the contents of said request register, said output signal being connected to and received by said respective register scan module.

3. A data communication system as defined in claim 1 wherein said rotating storage media is a magnetic disc-file.

4. A combination of a digital computer and a rotating storage system, said rotating storage system comprising:

a. rotating data storage media having a timing track and data tracks segmented into a plurality of accessible data sectors; and b. an access controller comprising:

1. a timing module having an output signal responsive to the next addressable data sector on said rotating data storage media;
2. request registers having means for storing requests for access to said addressable data sectors;
3. a register scan module connected to said request registers and said timing module, said register scanning module having means for comparing the output signal of said timing module and the contents of said request register and outputting a signal when there is a request for the next data sector;
4. a data transfer module connected to said storage media and said timing and register scanning modules, said data transfer module having an output signal which is a function of the data stored in the data sector indicated by the output signal of said register scanning module.

5. A computer controlled data communications system for transmitting data between groups of external devices comprising:

a. a plurality of digital computers, given pairs thereof being a primary and secondary computer respectively to a respective group of external devices;

b. a plurality of line interface modules, each being responsive to the data of a group of external devices, each line interface module having input and output lines adapted to be received by a primary and secondary computer whereby the respective group of external devices is interfaced to said primary and secondary computer permitting data transfers therebetween;

c. a plurality of data storage units equal in number to said computers, each storage unit having input and output terminals connected to each of said computers, said rotary storage unit including a rotary data storage media having a timing track and data tracks segmented into a plurality of addressable data sectors, and an access controller comprising a timing module having an output signal responsive to the next addressable data sector of said data storage media, request registers having means for storing requests for access to said addressable data sectors, a register scan module connected to said request register and said register scanning module having means for comparing the output signal of said timing module and the contents of said request registers and outputting a signal when there is a request for the next addressable data sector, and a data transfer module connected to said data storage media and said timing and register scanning module, said data transfer module having an output signal which is a function of the data stored in the data sector indicated by the output signal of said register scanning module; and d. a plurality of monitors responsive to the operating status to said computers and said storage units, each of said monitors being connected to a primary computer and having an output signal to inform said secondary computer of the mode of operation of said primary computer.

6. A data communications system as defined in claim 1 wherein each of said access controllers includes a register bank switch connected to said request registers of one other of said access controllers and providing an output signal responsive to the contents of said request register, said output signal being connected to and received by said respective register scan module.

7. A combination as in claim 1 wherein said rotating storage media is a magnetic disc file.

* * * * *

75